July 13, 1965  G. M. BYRD  3,194,500
SURFACE DEGREASING AND CLEANING GUN
Filed March 20, 1963
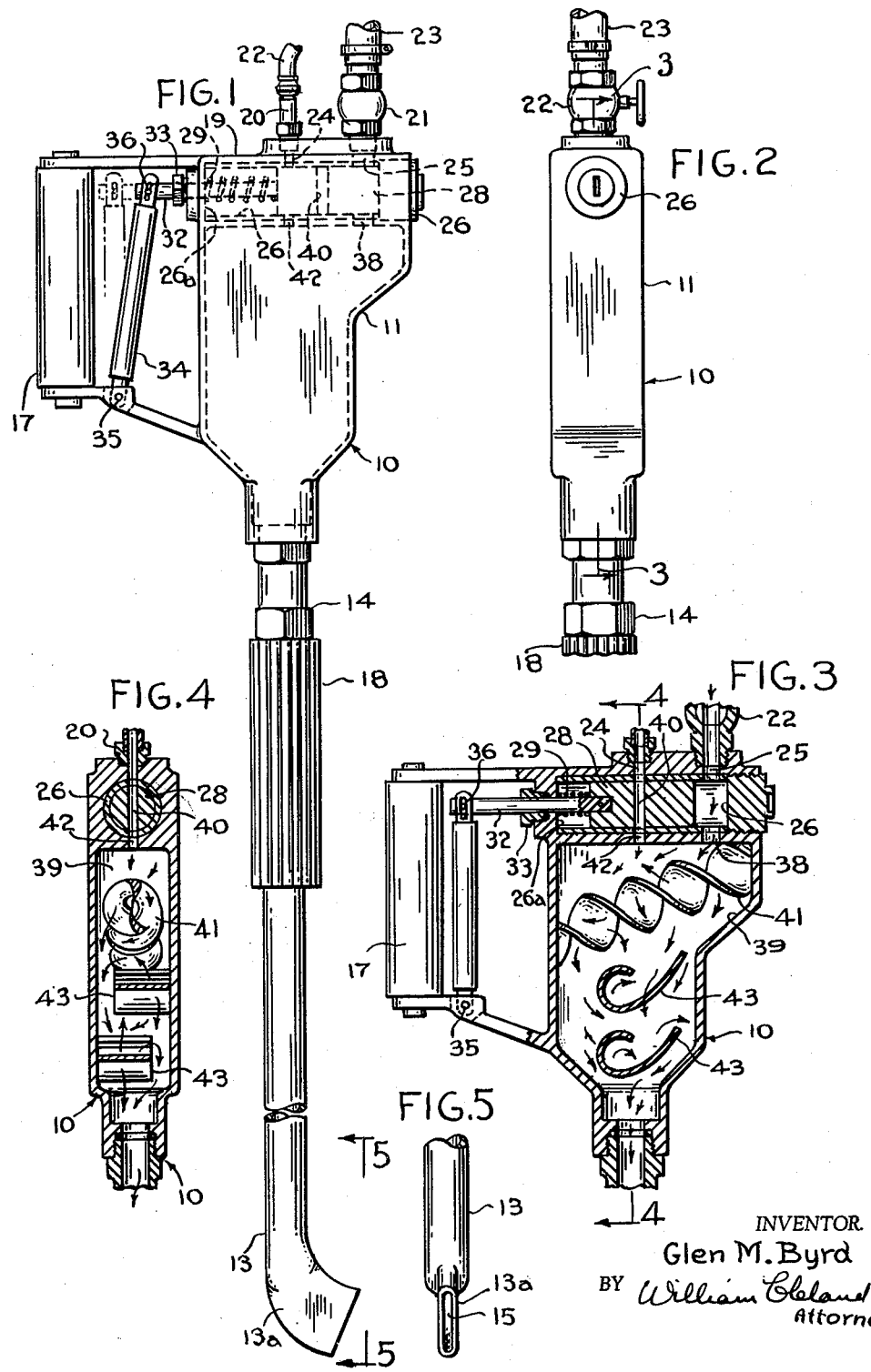
INVENTOR.
Glen M. Byrd
BY William Cleland
Attorney United States Patent Office 3,194,500
Patented July 13, 1965

3,194,500
SURFACE DEGREASING AND CLEANING GUN
Glen M. Byrd, 875 Snyder St., Akron, Ohio
Filed Mar. 20, 1963, Ser. No. 266,538
8 Claims. (Cl. 239—8)

This application is a continuation in part of co-pending application Serial No. 260,142, filed February 21, 1963, now abandoned.

This invention relates to a surface cleaning device as for removing grease, grime, salt, snow, or the like from automobile fenders, wheels, and other objects.

In the past, cleaning devices of the character described have been provided wherein steam was sprayed onto the surface to be cleaned through a nozzle at the end of an elongated pipe. Use of steam for this purpose, however, was not satisfactory because it was necessarily furnished at about 30 p.s.i., and while the heat of the stem was intended to melt snow and ice, for example, it could not produce sufficient force to loosen up and remove the same with any substantial degree of efficiency. Moreover, use of steam cleaning means required provision of expensive, space consuming steam generating equipment and skilled personnel to maintain and operate the same.

One object of the present invention is to provide a device for effiectively and efficiently loosening and removing grease, snow, ice and other stubborn materials from surfaces with use of economical, readily available, fluid medium.

Another object of the invention is to provide an improved method and apparatus for producing a steady stream of highly pressurized cleaning medium, which has greater effectiveness than steam for melting ice and snow on a surface or loosening grease or grime thereon, and which additionally has the effectiveness of a highly pressurized liquid for removing the loosened substance from the surface.

Other objects of the invention will be manifest from the following brief description and the accompanying drawings.

Of the accompanying drawings:

FIGURE 1 is a front elevation, partly broken away, of a degreasing and cleaning gun, embodying the features of the invention.

FIGURE 2 is an end elevation of the same, partly broken away, as viewed from the right of FIGURE 1.

FIGURE 3 is a fragmentary cross-section, taken substantially on the line 3—3 of FIGURE 2.

FIGURE 4 is a fragmentary cross-section taken substantially on the line 4—4 of FIGURE 3.

FIGURE 5 is a fragmentary side view of the nozzle portion of the device, as viewed substantially on the line 5—5 of FIGURE 4.

Referring to the drawings generally, the numeral 10 designates a degreasing and cleaning gun, including an agitator housing 11, at the lower end of which an elongated nozzle 13 may be connected, through a swivel connector 14, to rotate about a longitudinal axis through the housing. The nozzle 13 terminates in a flattened portion 13a which defines a narrow, ovate outlet orifice 15. Mounted on the housing, in substantially spaced relation to one side edge 16 thereof, may be a heat insulated hand grip 17, and a second heat insulated hand grip 18 is affixed on the nozzle 13 at a point near the housing, for guiding and steadying the device with one hand in use of the same, as well as for turning the nozzle with respect to the housing while the other hand is used to support and otherwise manipulate the housing.

Connected to the outer end wall 19 of the housing 11, remote from the nozzle 13, as by means of suitable fittings 20 and 21 may be flexible conduits 22 and 23, from readily available sources (not shown) of compressed air, and pressurized hot water substantially at boiling temperature, respectively. In most auto wash establishments, automobile garages, and service stations, compressed air is available at 120 p.s.i. or greater, and boiling hot water, say at from 200° F. to 212° F., is available from standard hot water lines at city pressures approximating 60 p.s.i. Thus, no expensive steam boiler or other special bulky equipment is required for employment of the present method and apparatus.

As best shown in FIGURES 1, 3 and 4, the air and hot water connections 21 and 22 communicate, through inlet apertures 24 and 25, with a fluid-pressure sealed valving chamber or bore 26 defined by a brass bushing 27 mounted in the housing, said bushing having a valving plunger 28 axially slidably received therein. Plunger 28 is normally yieldingly held in a valve closed position, to seal the inet apertures 24 and 25, by a compression spring 29 engaging between one end of the plunger and an end wall 26a of the bore nearest the hand grip 17, the other end of the plunger then being in stop or seating engagement with a fluid-sealing plug 30 screwed into the housing (see FIGURE 1). A stem 32 affixed to said one end of the plunger, is axially shiftably received through a packing gland 33 to extend from the housing adjacent hand grip 17. A heat insulated trigger bar 34 is suitably pivoted at one end to the housing at 35, generally to coextend with hand grip 17 toward pivotal connection at 36 with said extended stem 32, the arrangement being such that an operator, while gripping the hand grip 17, may extend a finger or fingers yieldingly to urge the trigger 34 from a valve closed full-line position thereof to the valve-open, chain-dotted position, as shown in FIGURE 1. That is, the plunger 28 is yieldingly moved from a closed position to an open position, as shown in FIGURES 1 and 3, respectively.

In the valve-open position shown in FIGURE 3 the plunger has moved to the left, so that the end thereof is past the hot water inlet aperture 25, thereby to permit passage of hot water, through valving chamber 26 and an aligned outlet aperture 38, into an agitator chamber 39 between the valving chamber and nozzle 13. Likewise as shown in FIGURE 3, the pressurized air from conduit 22 reaches chamber 39 through a passage 40 in the plunger aligned with air inlet aperture 24 and an air-outlet aperture 42. For purposes to be described later, the proportions of the plunger and passage 40 therein with respect to the aligned inlet and outlet apertures are such that the plunger is yieldingly operable either to allow only the passage of hot water to chamber 39, or to vary the proportions of hot water and compressed air.

Referring particularly to FIGURES 3 and 4, improved agitator means is provided in chamber 39 for thoroughly combining the compressed air into a new medium having requisite heat properties better than steam and yet possessing highly pressurized liquid body which is very effective for removing grease and grime from surfaces without damage to the same. To this end, an elongated spiral element 41 is shown positioned within chamber 39 to be at a convergent angle with respect to the axis of plunger bore 26, whereby water and compressed air, immediatetly upon entering chamber 39, strikes the spiral convolutions of member 41 to give the water and air a somewhat generally transverse swirling motion. As the swirling mixture is forced toward the nozzles 13 it is impinged against a plurality of vertically staggered, upwardly-opening, C-shaped vanes 43, 43, affixed to the housing walls. These vanes 43 have the effect of further and variously churning the mixture, so that upon entering nozzle 13 the air and water have no individual identity as such. The boiling hot, thoroughly agitated mixture, immediately upon leaving the constricting nozzle orifice 15 into the atmosphere, expands to a substantial extent without losing the aforesaid liquid characteristics. It is estimated that the resulting hot, somewhat gaseous, liquid jet sprayed from the nozzle, at any instant, would cover an area approximating from 1½ to 3½ feet of surface several feet away from the orifice 15, and at from at least 90 to 120 p.s.i., as compared with steam relatively ineffectively emanating from a similar nozzle opening at 30 p.s.i., or with cold water emanating from a hose at relatively low, ineffective, city water pressure.

In use of the improved cleaning gun 10 it is primarily in the inoperative or valve-closed condition shown in FIGURE 1. First the operator turns on compressed air at from 90 to 120 p.s.i. to air conduit 22, and tank-heated city water at approximately 210° to 212° F. to the conduit 23. Next, the trigger 34 is yieldingly compressed toward hand grip 17 just enough to allow the hot water only to flow into the mixing compartment 39 to fill the same completely and to flow from the nozzle at ordinary, somewhat gentle tap pressure. Now the operator, while supporting the device with one hand on hand-grip 17 and the other grasping hand-grip 18, to steady the device, squeezes the trigger 34 to the chain-dotted position thereof shown in FIGURE 1, thereby to move the plunger 28 to the full valve-open position of FIGURES 3 and 4. The immediate reaction is a continuous churning agitation of compressed air and boiling hot water within the chamber 39, and a continuous flow of boiling hot, greatly expanded gaseous liquid from the nozzle orifice 15. The force of this expanded liquid is such that when the end of the nozzle is held toward a surface to be cleaned, several feet away, the nozzle would be kicked backward should the operator release his grasp on the hand-grip 18. The hot expanded liquid is effective quickly to loosen up stubborn grease and grit from the surface and to flush it away immediately. The volume and effective pressure of the sprayed liquid may be varied by adjusting the plunger by means of trigger 34.

Modification of the invention may be resorted to without departing from the spirit thereof or the scope of the appended claims.

What is claimed is:

1. A method of providing a hot pressurized medium for treating surfaces as for removing grease, salt, snow, ice, or the like therefrom, comprising: the steps of agitating within a confining chamber, streams of water substantially at boiling temperature and of relatively low pressure, and compressed air, at a relatively high pressure of at least 90 pounds per square inch, and from separate continuous sources of the streams and thereby continuously to form a highly pressurized reconstituted mixture of air and water directly within the chamber; and continuously discharging the mixture from the mixing chamber through an orifice of reduced flow area into the atmosphere immediately to expand the same as a continuous stream of hot gaseous liquid of greatly increased flow area and with considerable force approximating the pressure of said compressed air, whereby the expanded fluid will have at least the grease reducing qualities of steam combined with the flushing qualities of water without undue harshness to surfaces being treated.

2. A surface degreasing and cleaning gun, comprising: a housing having an agitator chamber therein; a nozzle on said housing communicating with said chamber; separate connector means on said housing for connecting the same to separate sources of compressed air and hot water; valving means for selectively admitting said compressed air and hot water to said chamber; and agitator means, including a plurality of deflector surface portions variously disposed in different portions of the chamber for correspondingly agitating said hot water and compressed air with a swirling churning action, continuously to form a highly pressurized reconstituted mixture of air and water directly within the chamber which is continuously ejected through the nozzle, and which upon exposure to the atmosphere becomes a greatly expanded, gaseous cleaning liquid resembling steam but retaining the forceful pressure of the compressed air.

3. A gun as set forth in claim 2, said agitator means including irregular shaped deflectors for deflecting the admitted compressed air and water in various directions to create a turbulence within the chamber.

4. A gun as set forth in claim 3, said deflectors including curvate portions tending to swirl the flow of mixture reversely.

5. A gun as set forth in claim 2, said agitator means including a transversely extending, elongated spiral member tending to swirl the mixture crosswise of the path of flow thereof toward said nozzle.

6. A gun as set forth in claim 2, said agitator means including an elongated spiral member tending to swirl the mixture crosswise of the path of flow thereof toward said nozzle and curvate portions in said path tending to swirl the flow of mixture reversely.

7. A gun as set forth in claim 2, said nozzle being rotatably connected on said housing and having a handgrip means for turning the same with respect to the housing; and said housing having a handgrip thereon in spaced relation thereto.

8. A gun as set forth in claim 2, said nozzle being rotatably connected on said housing and having a handgrip means for turning the same with respect to the housing; and said housing having a handgrip thereon in spaced relation thereto; and manually operable trigger means being provided adjacent said housing handgrip means for operating said valving means.

References Cited by the Examiner

UNITED STATES PATENTS

| | | | |
|---|---|---|---|
| 1,419,948 | 6/22 | Sellars | 239—414 |
| 1,437,331 | 11/22 | Alexander | 134—36 |
| 1,450,881 | 4/23 | Allen | 239—399 |
| 1,751,719 | 3/30 | Uhri | 239—8 |
| 1,825,131 | 9/31 | Shepherd | 239—13 |
| 1,981,704 | 11/34 | Moore | 239—414 |
| 2,093,240 | 9/37 | Holmquist | 134—36 |
| 2,289,494 | 7/42 | Hadley et al. | 239—427 |
| 2,358,386 | 9/44 | Doll | 239—402 |
| 2,639,908 | 5/53 | Graham | 239—415 |
| 2,953,305 | 9/60 | Bondurant | 239—415 |
| 2,965,312 | 12/60 | Hale | 239—407 |
| 3,042,315 | 7/62 | Besser | 239—413 |
| 3,053,460 | 9/62 | Rudy | 239—407 |

EVERETT W. KIRBY, *Primary Examiner.*

MORRIS O. WOLK, *Examiner.*